United States Patent
Iwamoto et al.

(10) Patent No.: US 11,819,779 B2
(45) Date of Patent: Nov. 21, 2023

(54) CHROMATOGRAPHIC SEPARATION METHOD AND CHROMATOGRAPHIC SEPARATION DEVICE

(71) Applicant: Mitsubishi Chemical Aqua Solutions Co., Ltd., Shinagawa-ku (JP)

(72) Inventors: Keiji Iwamoto, Shinagawa-ku (JP); Makoto Yasumoto, Shinagawa-ku (JP); Toshihiko Uratsuji, Shinagawa-ku (JP)

(73) Assignee: Mitsubishi Chemical Aqua Solutions Co., Ltd., Tokyo (JP)

( * ) Notice: Subject to any disclaimer, the term of this patent is extended or adjusted under 35 U.S.C. 154(b) by 363 days.

(21) Appl. No.: 16/976,927

(22) PCT Filed: Feb. 28, 2019

(86) PCT No.: PCT/JP2019/007894
§ 371 (c)(1),
(2) Date: Aug. 31, 2020

(87) PCT Pub. No.: WO2019/168114
PCT Pub. Date: Sep. 6, 2019

(65) Prior Publication Data
US 2021/0039014 A1 Feb. 11, 2021

(30) Foreign Application Priority Data
Mar. 1, 2018 (JP) ................. 2018-037003

(51) Int. Cl.
*B01D 15/18* (2006.01)
*B01D 15/20* (2006.01)
*B01D 15/42* (2006.01)

(52) U.S. Cl.
CPC ..... *B01D 15/1807* (2013.01); *B01D 15/1828* (2013.01); *B01D 15/20* (2013.01); *B01D 15/424* (2013.01)

(58) Field of Classification Search
CPC ............. B01D 15/1807; B01D 15/1828; B01D 15/20; B01D 15/424
See application file for complete search history.

(56) References Cited

U.S. PATENT DOCUMENTS 5,064,539 A 11/1991 Tanimura et al.
5,405,534 A 4/1995 Ishida et al.
(Continued)

FOREIGN PATENT DOCUMENTS

EP 1 733 774 A1 12/2006
EP 2 667 188 A1 11/2013
(Continued)

OTHER PUBLICATIONS

Machine Translation of WO 2017/029949, Description.*
(Continued)

*Primary Examiner* — Benjamin L Lebron
(74) *Attorney, Agent, or Firm* — Oblon, McClelland, Maier & Neustadt, L.L.P.

(57) ABSTRACT

A chromatographic separation method for separating plural components contained in a liquid to be separated by a chromatography, with a separating device 1 including plural filling portions 10 filled with a separating agent for separating the plural components contained in the liquid to be separated, a supply portion 20 provided in each of the plural filling portions 10 to supply the liquid to be separated or an eluent for extracting any component contained in the liquid to be separated to the filling portion 10, and an extraction portion 30 to extract any component contained in the liquid to be separated from the filling portion 10, the method including: an upward supplying and extracting step of extracting any component contained in the liquid to be separated from an upward stream extraction portion while (Continued)

supplying the eluent to at least one filling portion 10 from an upward stream supply portion by an upward stream.

14 Claims, 9 Drawing Sheets

(56) References Cited

U.S. PATENT DOCUMENTS

| | | | |
|---|---|---|---|
| 5,556,546 | A | 9/1996 | Tanimura et al. |
| 6,149,818 | A | 11/2000 | Nakamura et al. |
| 6,156,195 | A | 12/2000 | Nakamura et al. |
| 2002/0088754 | A1 | 7/2002 | Tanimura et al. |
| 2007/0199873 | A1 | 8/2007 | Yamada et al. |
| 2013/0266706 | A1* | 10/2013 | Bussmann ............... A23L 2/80 426/490 |
| 2015/0073197 | A1* | 3/2015 | Jasra ..................... C10G 25/03 585/824 |
| 2017/0065906 | A1 | 3/2017 | Oroskar et al. |

FOREIGN PATENT DOCUMENTS

| | | | |
|---|---|---|---|
| JP | 2-49159 | A | 2/1990 |
| JP | 4-235701 | A | 8/1992 |
| JP | 7-232003 | A | 9/1995 |
| JP | 8-323104 | A | 12/1996 |
| JP | 10-332658 | A | 12/1998 |
| JP | 2002-143605 | A | 5/2002 |
| JP | 2005-288411 | A | 10/2005 |
| JP | 2014-29294 | A | 2/2014 |
| JP | 2017-37048 | A | 2/2017 |
| WO | WO 84/02854 | | 8/1984 |
| WO | WO 2017/029949 | A1 | 2/2017 |

OTHER PUBLICATIONS

Machine Translation of WO 2017/029949, Claims.*
Extended European Search Report dated Mar. 18, 2021 in European Patent Application No. 19760586.6, 9 pages.
Araùjo, J.M.M., et al., "Chiral separation by two-column, semi-continuous, open-loop simulated moving-bed chromatography" Journal of Chromatography A, Elsevier, vol. 1217, No. 33, Aug. 13, 2010, (Aug. 13, 2010), pp. 5407-5419, XP027169777, ISSN: 0021-9673 [retrieved on Jun. 23, 2010] *figures 4*.
Anonymous: "Simulated moving bed-wikipedia", May 5, 2017 (May 5, 2017), XP055784281, wikipedia.org Retrieved from the Internet: URL:https://en.wikipedia.org/w/index.php?title=Simulated moving bed&oldid=778653770 [Retrieved on Mar. 10, 2021]*the whole document*, 3 pages.
Notice of Reasons for Refusal dated Nov. 9, 2021 in Japanese Patent Application No. 2020-503620 (with English machine translation), 9 pages.
International Search Report dated Jun. 4, 2019 in PCT/JP2019/007894 filed on Feb. 28, 2019, 2 pages.
European Communication Pursuant to Aricle 94(3) EPC dated Apr. 6, 2023, in counterpart European Patent Application No. 19760586.8.

* cited by examiner

DOWNWARD SUPPLYING AND EXTRACTING STEP

SEPARATING AND CIRCULATING STEP

DOWNWARD SUPPLYING AND EXTRACTING STEP

UPWARD SUPPLYING AND EXTRACTING STEP

SEPARATING AND CIRCULATING STEP

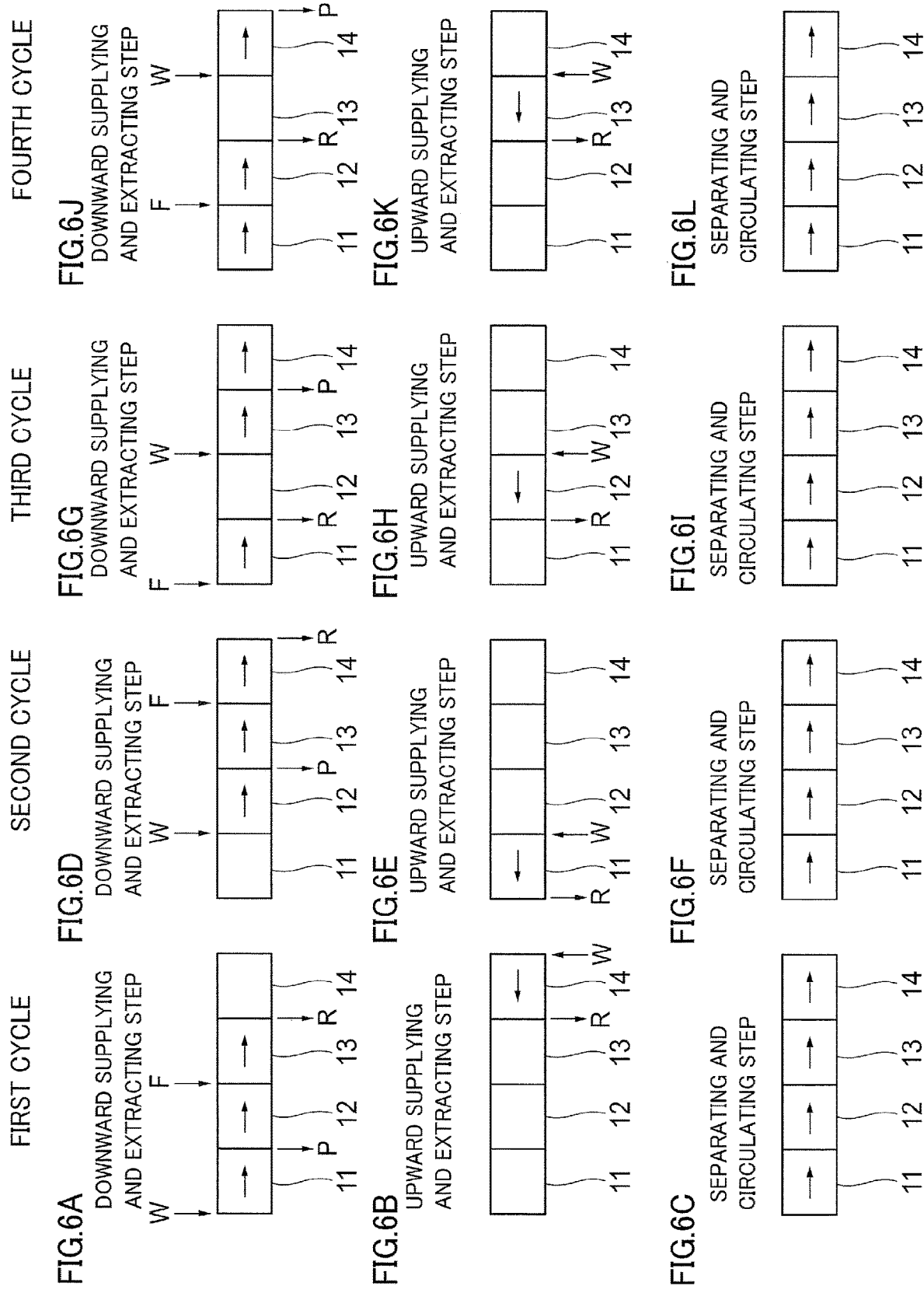

FIG.8A DOWNWARD SUPPLYING AND EXTRACTING STEP
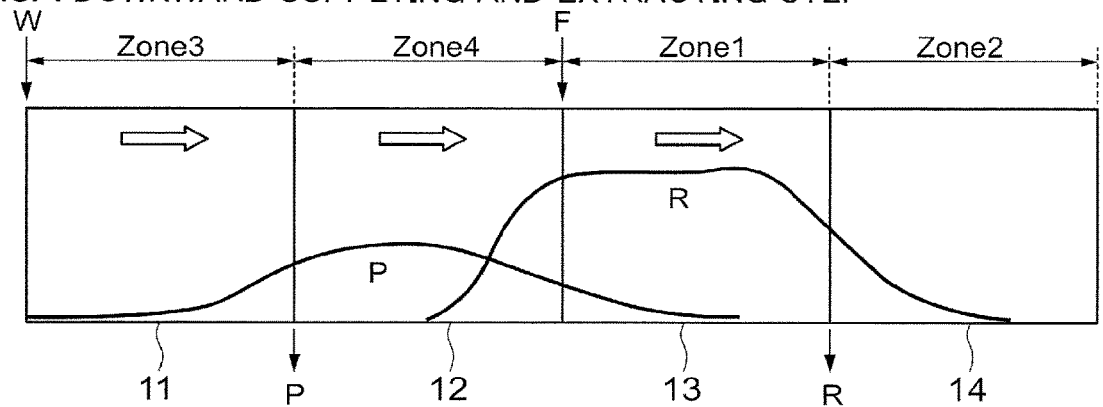
FIG.8B ADJUSTING AND CIRCULATING STEP
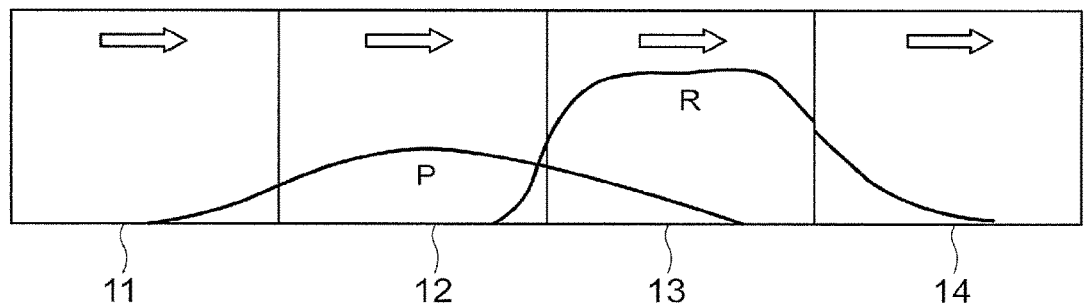
FIG.8C UPWARD SUPPLYING AND EXTRACTING STEP
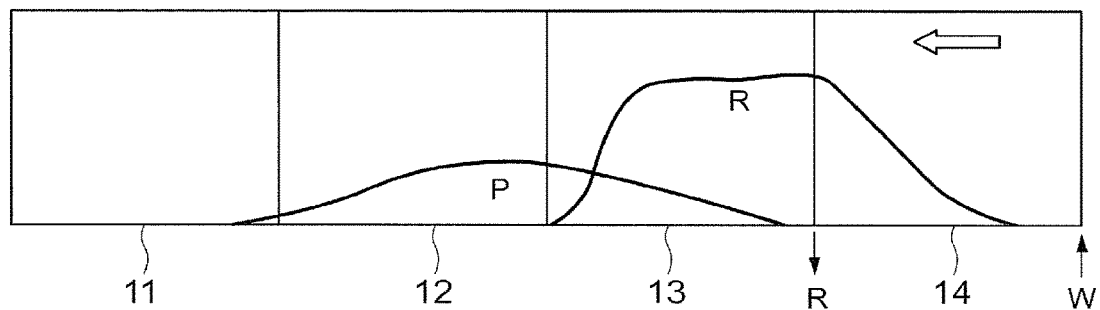
FIG.8D SEPARATING AND CIRCULATING STEP
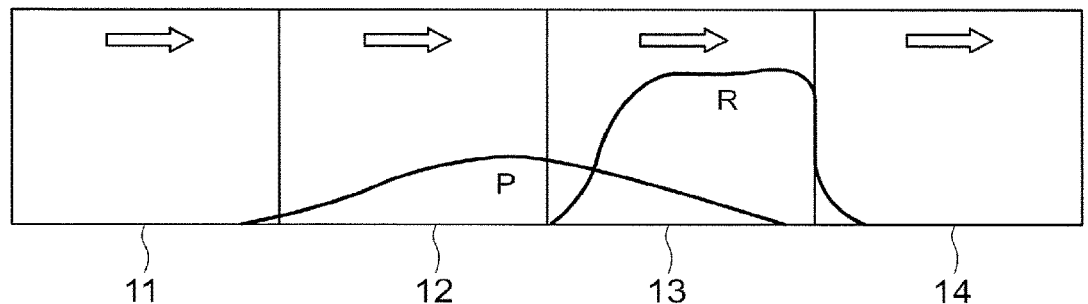

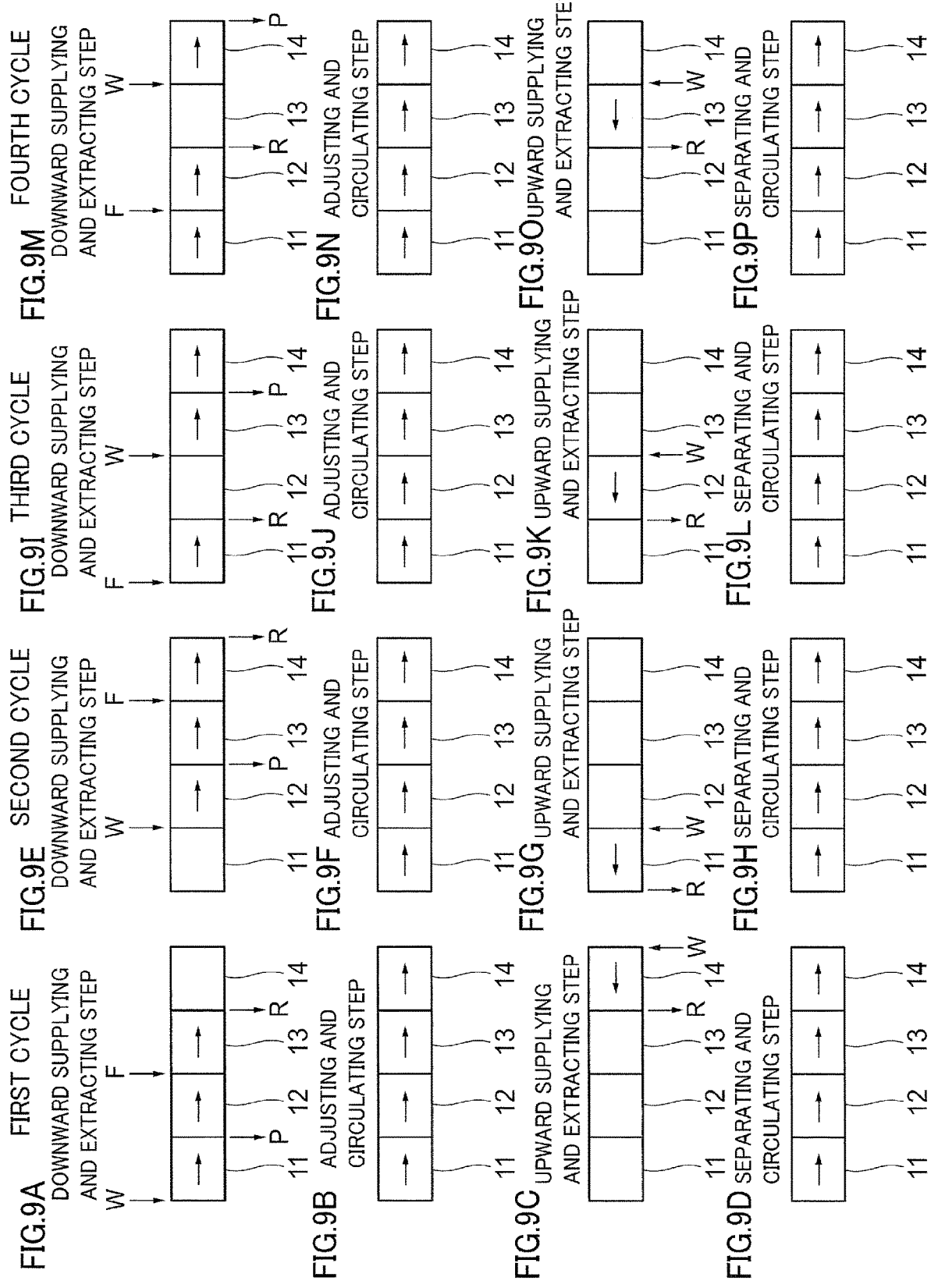

CHROMATOGRAPHIC SEPARATION METHOD AND CHROMATOGRAPHIC SEPARATION DEVICE

TECHNICAL FIELD

The present invention relates to a chromatographic separation method and the like, and more specifically, relates to a chromatographic separation method and the like in which a plurality of components in a liquid to be separated are separated by allowing the liquid to be separated to pass through a separating agent.

BACKGROUND ART

From the related art, a chromatographic separation method for performing a continuous chromatographic separation, such as a simulated moving bed chromatography, is known. Such a chromatographic separation method is particularly useful in the industrial field in which a massive amount of liquids to be separated are required to be treated. For example, the chromatographic separation method is widely used in the sugar production field such as a case where fruit sugar or grape sugar is separated from isomerized sugar, a case where sucrose is separated from molasses, and a case where a low-molecular component contained in oligosaccharide is removed. Several methods have been developed as the chromatographic separation method for performing the continuous chromatographic separation.

In Patent Literature 1, a method for separating a substance in a raw material fluid by using a chromatography device provided with a filled bed that is configured such that a fluid is capable of circularly flowing in one direction, includes a set of raw material fluid supply port, non-adsorbate fluid extraction port, desorbent fluid supply port, and adsorbate fluid extraction port in this order along the direction of the flow, is entirely partitioned into four zones of an adsorption zone occupying a portion between the raw material fluid supply port and the non-adsorbate fluid extraction port, a purification zone occupying a portion between the non-adsorbate fluid extraction port and the desorbent fluid supply port, a desorption zone occupying a portion between the desorbent fluid supply port and the adsorbate fluid extraction port, and a condensation zone occupying a portion between the adsorbate fluid extraction port and the raw material fluid supply port, and is configured such that the set of supply ports and extraction ports can be switched to another set of supply ports and extraction ports on a downstream after a lapse of a predetermined operation time is disclosed.

In addition, in Patent Literature 2, a method for performing a step including three stages of a supply-extraction stage of supplying an eluent to a first bed and a raw liquid to a third bed, in a simulated moving bed including four unit filled beds of a first bed to a fourth bed, of setting a part of the liquid flowing out from the first bed as a fraction rich in a B component and the entire liquid flowing out from the third bed as a fraction rich in a C component, and of extracting each of the fractions to the outside of the system, a circulation stage of circularly moving the liquid in the simulated moving bed in a downstream direction without performing supply-extraction of the liquid, and an extraction stage of supplying the eluent to the second bed such that the liquid in the bed is washed away in the downstream direction, of setting the total amount of the liquid flowing out from the first bed as a fraction rich in an A component, and of extracting the fraction to the outside of the system, and then, for repeating the step by switching a supply-extraction port of the liquid to the unit filled bed that is directly on a downstream is disclosed.

Further, in Patent Literature 3, a chromatographic separation method for supplying a raw material fluid containing a plurality of components to a chromatographic separation system of an endless circulation system, for forming an adsorption zone of each component in a filled bed, and then, for separating the adsorption zone into two or more fractions, the method including at least each step of: (i) a step of supplying a raw material and of extracting a fraction in which one component is enriched, (ii) a step of supplying a desorbent and of extracting a fraction in which other components are enriched, and (iii) a step of moving a mixed zone of a plurality of components by circulating the fluid in the bed without supplying the raw material to the filled bed and extracting the fraction, the method repeating a cycle including the steps, in which the filled bed includes a filled bed for supplying the raw material fluid and one or more other filled beds, and the filled bed for supplying the raw material fluid is filled with an ion exchange resin having an average particle diameter and/or a high degree of cross-linkage that is larger than those of an adsorbent (an ion exchange resin) in the other filled beds, is disclosed.

CITATION LIST

Patent Literature

Patent Literature 1: JP 2-49159 A
Patent Literature 2: JP 7-232003 A Patent Literature 3: JP 2002-143605 A

SUMMARY OF THE INVENTION

Problem to be Solved by the Invention

As described above, in the chromatographic separation method for performing the continuous chromatographic separation such as a simulated moving bed chromatography, it is generally expected to treat a massive amount of liquids to be separated. For this reason, it is desirable that a treatment amount of the liquid to be separated per a unit amount of a separating agent is large, and the liquid to be separated having a high concentration can be treated. On the other hand, such factors cause an increase in a pressure loss. In a case where the pressure loss increases, the separating agent is likely to be consolidated, and separating performance is likely to decrease. Therefore, in order to suppress such a problem, an operation such as reducing viscous properties by decreasing the load amount or the concentration of the liquid to be separated, selecting a suitable particle diameter of the separating agent, and decreasing viscous properties of the liquid to be separated by increasing the temperature is performed, and thus, the pressure loss is controlled.

However, a decrease in the load amount or the concentration of the liquid to be separated causes an increase in the treatment amount of the liquid to be separated, and thus, the device is likely to be enlarged. In addition, in a case where the particle diameter of the separating agent is increased, the separating performance is likely to decrease. Further, the viscous properties of the liquid to be separated are decreased by increasing the temperature, but in a case where a sugar liquid or the like is the liquid to be separated, coloration is likely to occur due to an increase in the temperature, and thus, there are many cases where a temperature of approximately 60° C. is an upper limit of the temperature. In addition, in a case where the sugar liquid or the like that is basically derived from a natural product is the liquid to be separated, in most cases, the composition is changed every year, in other words, every time. For this reason, a phenomenon such as an excessive increase in the viscous properties of the liquid to be separated and easy coloration due to an increase in the temperature is likely to occur, and thus, there may be a case where it is necessary to perform a separating operation at a lower temperature. Then, as a result thereof, the viscous properties of the liquid to be separated do not particularly decrease, and thus, the pressure loss is likely to increase. For this reason, the separating agent is consolidated, and a stable operation for a long period tends to be difficult. Further, in a case where the separating agent is consolidated, not only does the separating performance decrease, but also the separating operation itself is not capable of being performed. At this time, device washing, an operation of loosening the separating agent, or the like is required.

An object of the invention is to provide a chromatographic separation method and the like in which the consolidation of a separating agent is less likely to occur in continuous chromatographic separation.

Means for Solving Problem

The present inventors have conceived that the object is attained by introducing an upward stream to any of steps in chromatographic separation, contrary to common sense in continuous chromatographic separation.

Here, in the continuous chromatographic separation, in order to maintain a piston flow and bring out high separating performance, it is common sense for a person skilled in the art to supply a liquid to be separated or an eluent by a downward stream.

In a large-size continuous chromatographic separation device that is industrially used, it is difficult to closely fill a filling portion filled with a separating material at the time of filling a massive amount of granular bodies, and thus, a space is formed between a column top and a surface layer of a separating agent (a resin) at least through the operation. In such a state, in a case where the liquid to be separated or the eluent is introduced into the filling portion by a downward stream, a pressure due to the liquid acts in a direction in which the separating agent is pushed down, and thus, the position of the separating material is rarely changed (does not flow in the filling portion) and therefore, the piston flow can be retained. On the other hand, in a case where the liquid to be separated or the eluent is introduced into the filling portion by an upward stream, the pressure due to the liquid acts in a direction in which the separating agent is pushed up, and thus, the separating agent flows. In a case where the separating agent flows, it is difficult to retain the piston flow and thus, there is a concern that the separating performance decreases.

As a result of the intensive studies of the present inventors about an operation condition regardless of the common sense of the related art, it has been found that it is possible to implement the chromatographic separation without decreasing the separating performance even in a case where an upward stream extracting step is incorporated in a part of the chromatographic separation, and thus, the invention has been completed.

According to the invention, a chromatographic separation method for separating a plurality of components contained in a liquid to be separated by a chromatography, with a separating device including a plurality of filling portions filled with a separating agent for separating the plurality of components contained in the liquid to be separated, a supply portion provided in each of the plurality of filling portions to supply the liquid to be separated or an eluent for extracting any component contained in the liquid to be separated to the filling portion, and an extraction portion provided in each of the plurality of filling portions to extract any component contained in the liquid to be separated from the filling portion, the method including: an upward supplying and extracting step of extracting any component contained in the liquid to be separated from an upward stream extraction portion while supplying the eluent to at least one filling portion from an upward stream supply portion by an upward stream, is provided.

Here, the upward stream supply portion can be the extraction portion, and the upward stream extraction portion can be the supply portion. In this case, it is possible to further simplify a device configuration.

In addition, the chromatographic separation method is capable of further including: a downward supplying and extracting step of supplying the liquid to be separated and the eluent to different filling portions of the plurality of filling portions from the supply portion by a downward stream and of extracting a separated liquid from any of the extraction portions. In this case, it is possible to extract the component that is separated.

Then, the chromatographic separation method is capable of further including: a circulating step of circulating the liquid to be separated and the eluent in the filling portion between the filling portions by a downward stream, without supplying the liquid to be separated and the eluent. In this case, it is possible to accelerate the separation of the plurality of components.

Further, the chromatographic separation method is capable of further including: a downward supplying and extracting step of supplying each of the liquid to be separated and the eluent to different filling portions of the plurality of filling portions from the supply portion by a downward stream and of extracting a separated liquid from any of the extraction portions; and a circulating step of circulating the liquid to be separated and the eluent in the filling portion between the filling portions by a downward stream, without supplying the liquid to be separated and the eluent. In this case, it is possible to continuously perform the chromatographic separation.

In addition, the circulating step can be a separating and circulating step that is performed after the upward supplying and extracting step and advances the separation of the plurality of components. In this case, it is easy to more continuously perform chromatographic separation.

Further, three steps of the downward supplying and extracting step, the upward supplying and extracting step, and the separating and circulating step can be performed in this order. In this case, a more preferred order of the steps for continuously performing the chromatographic separation is set.

In addition, the three steps can be repeated. In this case, it is possible to perform the separating operation for a longer period.

In addition, two steps of the downward supplying and extracting step and the separating and circulating step can be repeated in this order, and the three steps can be inserted during the repetition of the two steps. In this case, as necessary, a step of loosening the separating agent can be inserted.

Further, an adjusting and circulating step that is performed between the downward supplying and extracting step and the upward supplying and extracting step and adjusts a position of the liquid to be separated and the eluent can be further included as the circulating step. In this case, it is possible to adjust the position of a concentration distribution of the liquid to be separated or the eluent to a better position for the next step.

In addition, four steps of the downward supplying and extracting step, the adjusting and circulating step, the upward supplying and extracting step, and the separating and circulating step can be performed in this order. In this case, a more preferred order of the steps for continuously performing the chromatographic separation is set.

Then, the four steps can be repeated. In this case, it is possible to perform the separating operation for a longer period.

Two steps of the downward supplying and extracting step and the separating and circulating step can be repeated in this order, and the four steps can be inserted during the repetition of the two steps. In this case, as necessary, a step of loosening the separating agent can be inserted.

The filling portion used when the eluent flows by an upward stream in the upward supplying and extracting step can be sequentially moved to an upstream side in an upward stream at each time when the upward supplying and extracting step is repeated. In this case, it is possible to select a more preferred filling portion for continuously performing the chromatographic separation.

In the upward supplying and extracting step, a separated liquid can be extracted from the upward stream extraction portion of the filling portion for supplying the eluent. In this case, it is possible to extract the separated liquid from a more suitable position.

Further, the filling portion in which the eluent flows by a downward stream in the downward supplying and extracting step and the filling portion in which the eluent flows by an upward stream in the upward supplying and extracting step that is initially performed after the downward supplying and extracting step can be different filling portions. In this case, it is possible to prevent the separated components from being mixed.

Then, the eluent is capable of flowing to one or a plurality of filling portions by a downward stream in the downward supplying and extracting step, one component of the plurality of components contained in the liquid to be separated can be extracted from the extraction portion of the filling portion that is positioned on the most downstream side in the filling portions used at that time, the eluent s capable of flowing to one or a plurality of filling portions by an upward stream in the upward supplying and extracting step, and the one component can be extracted from the upward stream extraction portion of the filling portion that is positioned on the most downstream in the filling portion used at that time. In this case, it is possible to more efficiently extract one component.

In addition, according to the invention, a chromatographic separation device, including: a plurality of filling portions filled with a separating agent for separating a plurality of components contained in a liquid to be separated by a chromatography; a supply portion provided in each of the filling portions to supply the liquid to be separated to the filling portion; an extraction portion provided in each of the filling portions to extract a separated liquid rich in any component in the liquid to be separated from the filling portion; and a switching portion in which switching for supplying an eluent for extracting the separated liquid from any one of the supply portion and the extraction portion is performed and the separated liquid is extracted by reversing a flowing direction of the eluent when the eluent is supplied from the supply portion and when the eluent is supplied from the extraction portion is provided. In this case, it is possible to provide a chromatographic separation device in which the consolidation of a separating agent is less likely to occur in continuous chromatographic separation.

Here, in the switching portion, when the eluent is supplied from the extraction portion, control for extracting the separated liquid from the supply portion of the filling portion in which the extraction portion for supplying the eluent is provided while supplying the eluent to any of the extraction portions by an upward stream can be performed. In this case, it is possible to extract the separated liquid from a more suitable position.

In addition, in the switching portion, control for supplying the liquid to be separated and the eluent from each of the supply portions by a downward stream and for extracting the separated liquid from any of the extraction portions can be further performed. In this case, it is possible to efficiently extract the separated liquid.

Further, in the switching portion, control for circulating the liquid to be separated and the eluent in the filling portion between the filling portions by a downward stream, without supplying the liquid to be separated and the eluent, can be further performed. In this case, it is possible to continuously perform the chromatographic separation.

EFFECT OF THE INVENTION

According to the invention, it is possible to provide a chromatographic separation method and the like in which the consolidation of a separating agent is less likely to occur in continuous chromatographic separation. In addition, in a case where a branch pipe filter for a liquid to be separated or an eluent is provided in a supply portion, the branch pipe filter is washed with an upward stream, and thus, it is possible to expect a reduction in a pressure loss of the device.

BRIEF DESCRIPTION OF DRAWINGS

FIGS. 6(a) to 6(l) are diagrams illustrating a direction of a flow of a liquid to be separated or an eluent in a filling portion in a case where three steps of step 201 to step 203 are repeated four times (the first cycle to the fourth cycle);

FIGS. 8(a) to 8(d) are diagrams illustrating a concentration distribution of each of a P component and an R component in a filling portion; and FIGS. 9(a) to 9(p) are diagrams illustrating a direction of a flow of a liquid to be separated or an eluent in a filling portion in a case where four steps of step 301 to step 304 are repeated four times (the first cycle to the fourth cycle).

MODE(S) FOR CARRYING OUT THE INVENTION

Figure 1:
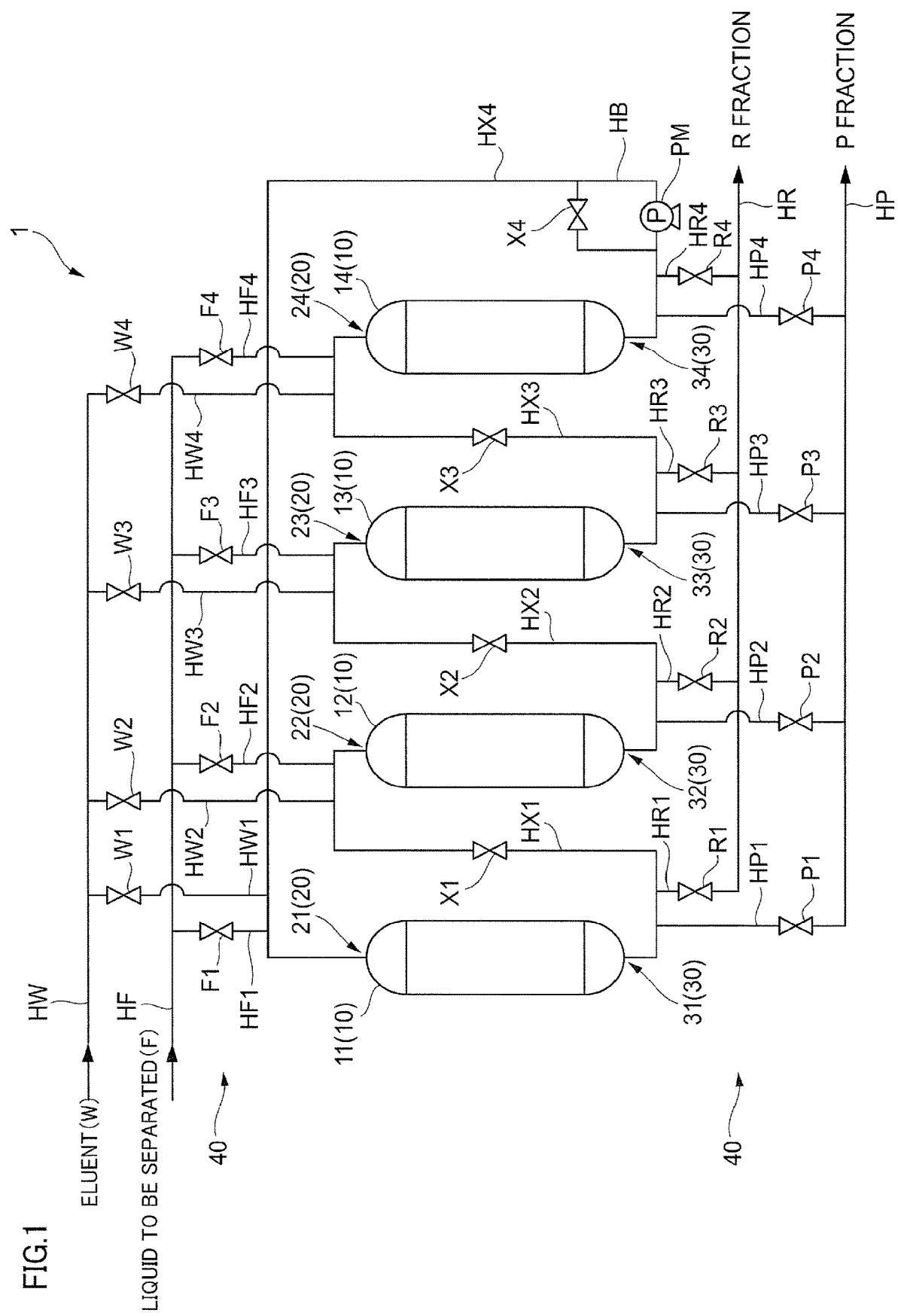
FIG. 1 is a diagram illustrating a chromatographic separation device to which this embodiment is applied.

Hereinafter, modes for implementing the invention will be described in detail. Note that, the invention is not limited to the following embodiments, and can be implemented by being variously modified within the scope of the gist thereof. In addition, the drawings to be used are for describing this embodiment, and do not represent the actual size.

<Description of Liquid to be Separated, Separating Agent, and Fluent>

(Liquid to Be Separated)

A liquid to be separated of this embodiment is a liquid that is a target for separating a plurality of components to be contained by using a chromatographic separation device described below, and is a liquid in which a plurality of components are dissolved in a solvent such as water or an organic solvent. Then, the plurality of components are broadly separated into two fractions by using a difference in an interaction of each of the components with respect to a separating agent. In a case where the plurality of components, for example, are two components of a. P component and an R component, the components are separated, and thus, any or both of the P component and the R component can be selectively extracted as a useful component. Note that, in the following description, a component having a larger interaction with respect to the separating agent is the P component, a component having a smaller interaction with respect to the separating agent is the R component (in a case where the interaction with respect to the separating agent is R Component<P Component), and the case of separating the P component and the R component will be described. That is, in this case, in a case where the liquid to be separated passes through the separating agent, a passing velocity of the R component is faster than a passing velocity of the P component. As a result thereof, the R component is likely to proceed first and the P component is likely to remain behind in a liquid passing direction. That is, the P component and the R component are separated. Note that, hereinafter, a liquid after the components are separated, which is a liquid rich in any of the P component and the R component, may be referred to as a "separated liquid".

Note that, the separation is not limited to a case where the component to be contained is two components, the component to be contained may be three or more components. Then, the separation can also be applied to the case of separating one component from the components, the case of broadly separating each component into two fractions, or the like.

In this embodiment, even in a case where the liquid to be separated has a high viscosity, it is possible to separate the component in the liquid to be separated. Specifically, a liquid to be separated containing saccharide such as oligosaccharide and maltose can be exemplified.

(Separating Agent)

The separating agent that is used in this embodiment is not particularly limited, and a synthetic adsorbent, an ion exchange resin, and the like can be used.

In the synthetic adsorbent, a reversed-phase chromatography using a difference in the hydrophobicity of each of the components, and a normal-phase chromatography using a π-π interaction, a hydrogen bond, and the like are the main separation principle.

In addition, in the ion exchange resin, a size-exclusion chromatography using a difference in a molecular size, an ion-exclusion chromatography using a repulsive force with respect to a functional group, and the like are the main separation principle.

As the synthetic adsorbent, any of an aromatic adsorbent, aromatic modified adsorbent, a methacryl-based adsorbent may be used. In addition, as the ion exchange resin, any of a strongly acidic cation exchange resin, a weakly acidic cation exchange resin, a strongly basic anion exchange resin, and a weakly basic anion exchange resin may be used.

Here, in a case where a liquid to be separated of high viscous properties, for example, a sugar liquid or the like is used as the liquid to be separated, it is preferable to use a strongly acidic cation exchange resin.

As the separating agent, for example, UBK510L, UBK530, UBK550, UBK535J, UBK535K, and the like, manufactured by Mitsubishi Chemical Corporation, which are a cation exchange resin for industrial chromatographic separation, can be used. In addition, AMBERLITE CR1320 manufactured by The Dow Chemical Company, LEWATIT MDS1368 manufactured by LANXESS AG, and the like can be used.

It is preferable that a particle diameter of particles configuring the separating agent is more homogeneous. For example, as a grain size distribution, it is preferable that the particle diameter is 150 μm to 450 μm, and it is preferable that a ratio of particles of approximately 220 μm to 360 μm is greater than or equal to 80% of the entire particles in a volume ratio. In addition, it is more preferable that the ratio is greater than or equal to 85%.

(Eluent)

In this embodiment, the eluent is a liquid that is used for developing a component in a filling layer filled with the separating agent and for adjusting the size of an interaction between the separating agent and the component.

In the synthetic adsorbent, the interaction between the separating agent and the component is adjusted by an eluent concentration, and thus, it is possible to separate and elute each of the components without completely adsorbing the components. For example, alcohols such as ethanol or methanol, or hexanes can be used as the eluent.

In addition, the molecular size or a weak interaction between the functional group and the component is used in the ion exchange resin, and thus, pure water is generally used as the eluent. In addition, in order to maintain the stability or the dissociation state of the component in the separated liquid, an aqueous acidic solution containing a hydrochloric acid, a sulfuric acid, or the like, or an aqueous alkaline solution containing sodium hydroxide or the like may be used.

Hereinafter, a chromatographic separation device to which this embodiment is applied will be described on the basis of the drawings.

<Description of Chromatographic Separation Device>

FIG. 1 is a diagram illustrating a chromatgraphic separation device 1 to which this embodiment is applied.

The chromatographic separation device 1 includes a filling portion 10 that separates a component, a supply portion 20 for supplying a liquid to be separated or an eluent, an extraction portion 30 for extracting a separated liquid, and a switching portion 40 for switching a flow path.

In this embodiment, four filling portions 10 are provided. In this embodiment, filling portions 11, 12, 13, and 14 (filling portions 11 to 14) are illustrated as the filling portion 10. Note that, hereinafter, in the case of not distinguishing the filling portions 11, 12, 13, and 14 from each other, the filling portions 11, 12, 13, and 14 may be simply referred to as the filling portion 10. The filling portion 10 is filled with the separating agent for separating a plurality of components contained in the liquid to be separated by a chromatography. It is more preferable that a separation column filled with the separating agent is a packed column not having a void column in the upper portion. Note that, it is sufficient that the number of filling portions 10 is 2. Here, it is more preferable that the number of filling portions 10 is greater than or equal to 3 from the viewpoint of a separation efficiency, and in a case where it is necessary to change or adjust an operation condition of a system, on the basis of the type of liquid to be separated, and the like, it is even more preferable that the number of filling portions 10 is greater than or equal to 4. In addition, the number of filling portions 10 may be greater than or equal to 5.

The filling portion 10, for example, is a column, and has a space to be filled with the separating agent inside. The filling portion 10, for example, is formed of a steel plate or the like, as a material, and a wetted portion can be subjected to rubber lining, but the filling portion is not limited thereto. For example, a resin or the like can also be used as the material of the filling portion 10. In addition, the shape of the filling portion 10 is not particularly limited, and in this embodiment, the filling portion 10, for example, has an approximately cylindrical shape, and has a columnar shape as a whole.

The supply portion 20 is provided in each of the filling portions 10 to supply the liquid to be separated or the eluent to the filling portion 10. The supply portion 20, for example, is a supply port provided in the upper portion of the filling portion 10. In this embodiment, supply portions 21, 22, 23, and 24 (supply portions 21 to 24) are illustrated as the supply portion 20. Note that, hereinafter, in the case of not distinguishing the supply portions 21, 22, 23, and 24 from each other, the supply portions 21, 22, 23, and 24 may be simply referred to as the supply portion 20. In addition, in an illustrative example, one supply portion 20 is provided in each of the filling portions 10, but a plurality of supply portions 20 may be provided. For example, two supply portions 20 may be separately provided in the case of supplying the liquid to be separated and in the case of supplying the eluent.

The extraction portion 30 is provided in each of the filling portions 10 to extract the separated liquid rich in any component in the liquid to be separated from the filling portion 10. The extraction portion 30, for example, is a discharge port provided in the lower portion of the filling portion 10. In this embodiment, extraction portions 31, 32, 33, and 34 (extraction portions 31 to 34) are illustrated as the extraction portion 30. Note that, hereinafter, in the case of not distinguishing the extraction portions 31, 32, 33, and 34 from each other, the extraction portions 31, 32, 33, and 34 may be simply referred to as the extraction portion 30. In addition, in an illustrative example, one extraction portion 30 is provided in each of the filling portions 10, but a plurality of extraction portions 30 may be provided. For example, two extraction portions 30 may be separately provided in the case of extracting a P fraction that is a separated liquid rich in a P component in the liquid to be separated and the case of extracting an R fraction that is a separated liquid rich in an R component. In this case, it is possible to provide each of the extraction portions 30 in a more suitable position for extracting the P fraction or the R fraction. Even though the details will be described below, in this embodiment, there is a case where the eluent is supplied from the extraction portion 30. For this reason, a supply port that is used at this time may be separately provided. Accordingly, the extraction portion 30 for extracting the separated liquid and the supply port for supplying the eluent are separated, and thus, interference with respect to other filling portions 10 or pipings HX1 to HX4 described below is suppressed, and a separating operation is likely to be stably performed.

The switching portion 40, for example, is an on-off valve. Then, it is possible to switch the flow path of the liquid to be separated, the eluent, and the separated liquid by opening and closing the on-off valve. In this embodiment, the switching portion 40 includes an eluent on-off valves W1, W2, W3, and W4 (eluent on-off valves W1 to W4), liquid to be separated on-off valves F1, F2, F3, and F4 (liquid to be separated on-off valves F1 to F4), connection path on-off valves X1, X2, X3, and X4 (connection path on-off valves X1 to X4), R component on-off valves R1, R2, R3, and R4 (R component on-off valves R1 to R4), and P component on-off valves P1, P2, P3, and P4 (P component on-off valves P1 to P4).

In addition, the chromatographic separation device 1 includes piping HW for supplying the eluent from an eluent tank or the like, piping HW1 for supplying the eluent to the filling portion from the piping HW, piping HW2 for supplying the eluent to the filling portion 12 from the piping HW, piping HW3 for supplying the eluent to the filling portion 13 from the piping HW, and piping HW4 for supplying the eluent to the filling portion 14 from the piping HW. In this case, the eluent on-off valve W1 to W4 are respectively provided in the pipings HW1 to HW4, and control the supply of the eluent with respect to the filling portions 11 to 14.

Further, the chromatographic separation device 1 includes piping HF for supplying the liquid to be separated from a liquid to be separated tank or the like, piping HF1 for supplying the liquid to be separated to the filling portion 11 from the piping HF, piping HF2 for supplying the liquid to be separated to the filling portion 12 from the piping HF, piping HF3 for supplying the liquid to be separated to the filling portion 13 from the piping HF, and piping HF4 for supplying the liquid to be separated to the filling portion 14 from the piping HF. In this case, the liquid to be separated on-off valve F1 to F4 are respectively provided in the pipings HF1 to HF4, and control the supply of the liquid to be separated with respect to the filling portions 11 to 14.

In addition, the chromatographic separation device 1 further includes piping HX1 for connecting the extraction portion 31 of the filling portion 11 and the supply portion 22 of the filling portion 12, piping HX2 for connecting the extraction portion 32 of the filling portion 12 and the supply portion 23 of the filling portion 13, piping HX3 for connecting the extraction portion 33 of the filling portion 13 and the supply portion 24 of the filling portion 14, piping HX4 for connecting the extraction portion 34 of the filling portion 14 and the supply portion 21 of the filling portion 11, as a connection path for connecting each of the filling portions 10. In this case, the connection path on-off valves X1 to X4 are respectively provided in the pipings HX1 to HX4, and control the circulation of the liquid to be separated between the filling portions 11 to 14.

Note that, a bypass path HB is provided at the point of the connection path on-off valve X4 in the piping HX4, and a pump PM is provided in the bypass path HB. Note that, the bypass path HB and the pump PM are provided in the piping HX4, but may be provided in any of the pipings HX1 to HX4, and may be provided in a plurality of positions in the pipings HX1 to HX4 (for example, all positions.

Then, the chromatographic separation device 1 includes piping HR for extracting the R fraction, piping HR1 for extracting the R fraction to the piping FIR from the filling portion 11, piping HR2 for extracting the R fraction to the piping HR from the filling portion 12, piping HR3 for extracting the R fraction to the piping HR from the filling portion 13, and piping HR4 for extracting the R fraction to the piping HR from the filling portion 14. In this case, the R component on-off valves R1 to R4 are respectively provided in the pipings HR1 to HR4, and control the extraction of the separated liquid from the filling portions 11 to 14.

Then, the chromatographic separation device 1 includes piping HP for extracting the P fraction, piping HP1 for extracting the P fraction to the piping HP from the filling portion 11, piping HP2 for extracting the P fraction to the piping HP from the filling portion 12, piping HP3 for extracting the P fraction to the piping HP from the filling portion 13, and piping HP4 for extracting the P fraction to the piping HP from the filling portion 14. In this case, the P component on-off valves P1 to P4 are respectively provided in the pipings HP1 to HP4, and control the extraction of the separated liquid from the filling portions 11 to 14.

Even though the details will be described below, the switching portion 40 is used to perform switching for supplying the eluent for extracting the separated liquid from any one of the supply portion 20 and the extraction portion 30. In addition, the separated liquid is extracted by reversing a flowing direction of the eluent when the eluent is supplied from the supply portion 20 and when the eluent is supplied from the extraction portion 30.

<Description of Operation of Chromatographic Separation Device>

The chromatographic separation device 1 described above is operated as follows.

Here, first, the operation of a chromatographic separation device 1 of the related art will be described, and then, the operation of the chromatographic separation device 1 according to this embodiment will be described.

Figure 2:
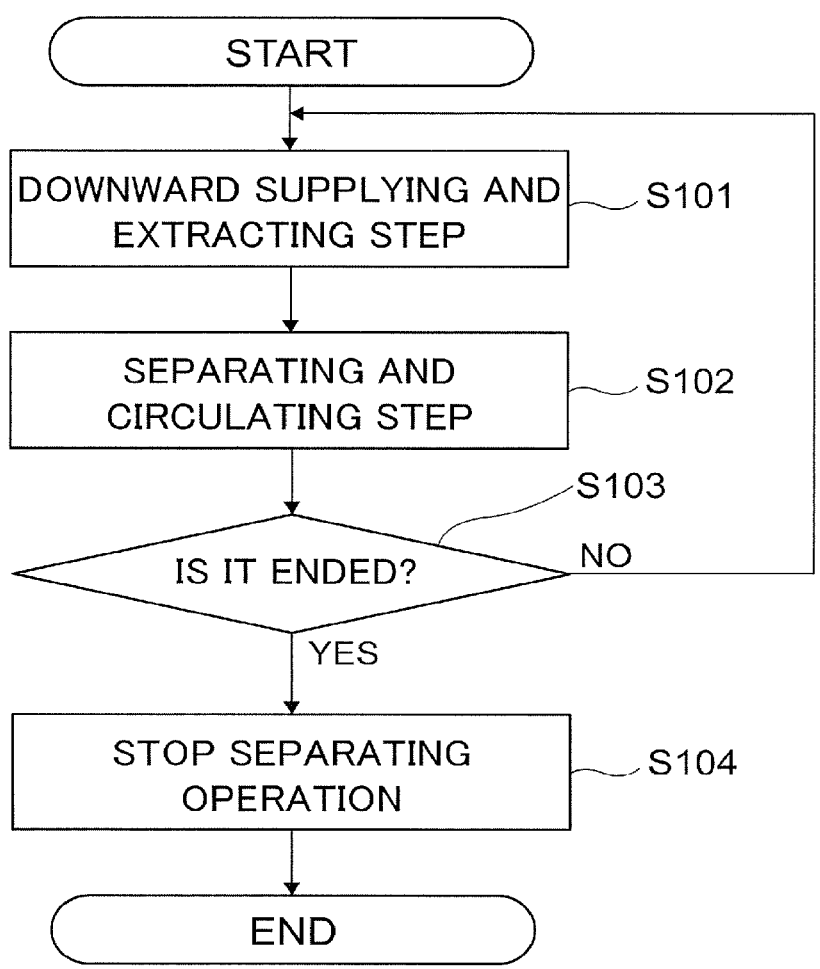
FIG. 2 is a flowchart describing an operation of a chromatographic separation device of the related art.

FIG. 2 is a flowchart describing the operation of the chromatographic separation device 1 of the related art.

Figure 3A:
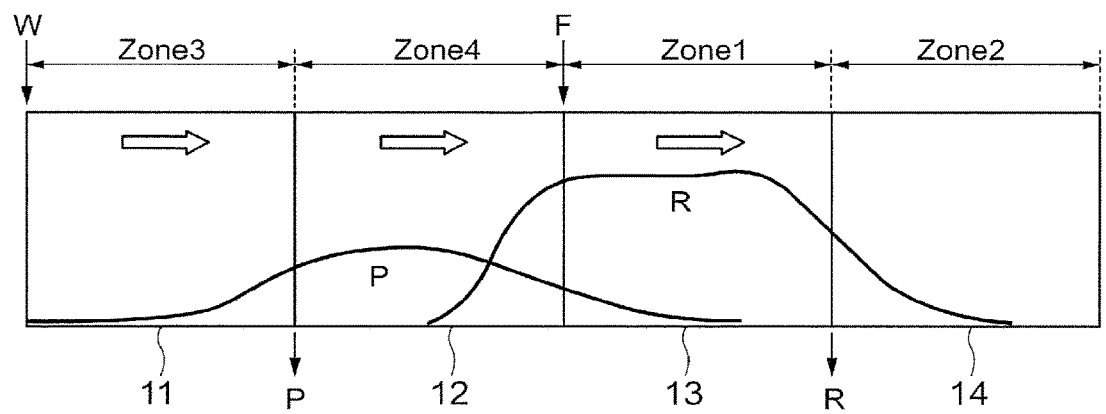
FIGS. 3(a) and 3(b) are diagrams illustrating a concentration distribution of each of a P component and an R component in a filling portion.
Figure 3B:
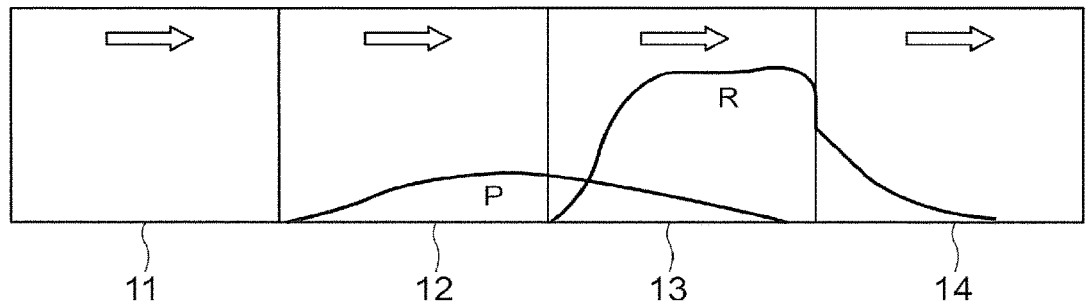

In addition, FIGS. 3(a) and 3(b) are diagrams illustrating a concentration distribution of each of the P component and the R component in the filling portions 11 to 14. Here, a horizontal direction represents a position in the filling portions 11 to 14. In each of the filling portions 11 to 14, in the drawing, the left side indicates the position of the upper portion in the filling portions 11 to 14 (on an upstream side), and in the drawing, the right side indicates the position of the lower portion in the filling portions 11 to 14 (on a downstream side). In addition, a vertical direction represents the concentration of the P component and the R component in each position. Further, in the filling portions 11 to 14, a right arrow and a left arrow indicate the direction of the flow of the liquid to be separated and the eluent, and the right arrow indicates that the liquid to be separated or the eluent flows into the filling portions 11 to 14 by a downward stream. In this case, the downward stream is a general direction of the flow in the separating operation. In contrast, the left arrow indicates that the liquid to be separated or the eluent flows into the filling portions 11 to 14 by an upward stream. In this case, the upward stream is opposite to a general direction of the flow. Further, a case where the right arrow and the left arrow are not illustrated indicates that there is no flow in the filling portions 11 to 14. In addition, a lower arrow and an upper arrow represent a point for supplying the liquid to be separated or the eluent and a point for extracting the P fraction that is the separated liquid rich in the P component or the R fraction that is the separated liquid rich in the R component. In the drawing, the liquid to be separated is represented by "F", the eluent is represented by "W", the P component or the P fraction is represented by "P", and the R component or the R fraction is represented by "R".

Note that, in FIG. 3, the filling portion 13 may be referred to as an adsorption zone (Zone 1), the filling portion 14 may be referred to as a purification zone (Zone 2), the filling portion 11 may be referred to as a desorption zone (Zone 3), and the filling portion 12 may be referred to as a condensation zone (Zone 4). Then, in this embodiment, the separating operation is continuously performed while shifting the zones one by one. Note that, a method described below may be referred to as an advanced simulated moving bed chromatography.

In the filling portions 11 to 14, in a case where the liquid to be separated passes through the separating agent, as described above, the passing velocity of the R component is faster than the passing velocity of the P component. For this reason, for example, as illustrated in FIG. 3(a), the R component is likely to proceed first and the P component is likely to remain behind in the liquid passing direction. That is, in the filling portions 11 to 14, the P component and the R component are in a state of being separated.

Then, in the state of FIG. 3(a), each of the liquid to be separated and the eluent is supplied to different filling portions 10 of a plurality of filling portions 10 from the supply portion by a downward stream. In addition, the separated liquid rich in the P component and the separated liquid rich in the R component are respectively extracted from separate extraction portions (step 101: a downward supplying and extracting step).

In this case, the liquid to be separated on-off valve F3, the eluent on-off valve W1, the connection path on-off valves X1 and X2, the P component on-off valve P1, and the R component on-off valve R3 are opened, and the other on-off valves are closed. Accordingly, the liquid to be separated is supplied to the filling portion 13 from the supply portion 23, and the eluent is supplied to the filling portion 11 from the supply portion 21. In addition, the P fraction that is the separated liquid rich in the P component is extracted from the extraction portion 31, and the R fraction that is the separated liquid rich in the R component is extracted from the extraction portion 33.

That is, in the downward supplying and extracting step, the P component is eluted by the eluent that is supplied to the filling portion 11 from the supply portion and the P fraction that is the separated liquid rich in the P component is extracted to the piping HP1 as a part of the supplied eluent. In addition, the residue of the eluent that is not extracted from the extraction portion 31 flows into the filling portion 12 from the piping HX1. Accordingly, the eluent is moved in a downward direction, and is circulated in the filling portion 12 and the filling portion 13. Then, in the filling portion 12 and the filling portion 13, the separation of the P component and the R component is advanced, and the concentration distribution of the P component and the R component is also moved to the downstream side. Then, the liquid to be separated is supplied to the filling portion 13, and the R fraction that is the separated liquid rich in the R component is extracted to the piping HR3 from the extraction portion 33 of the filling portion 13.

Here, a liquid amount that is extracted to the piping HP1 is a part of a liquid amount that is supplied from the supply portion 21. Accordingly, in order to control such a flow rate, it is necessary to attach a pump before the piping HP1 to perform the extraction at a constant flow rate or to adjust an extraction amount with an integrating flow meter.

Note that, in the downward supplying and extracting step, an operation of supplying the liquid to be separated from the supply portion 23 and of extracting the R fraction from the extraction portion 33, an operation of supplying the eluent from the supply portion 21 and of extracting the P fraction from the extraction portion 31, and an operation of supplying the eluent from the supply portion 21 and of extracting the R fraction from the extraction portion 33 may be respectively implemented by being divided.

Then, at a time point when step 101 is ended, the concentration distribution of the P component and the R component is as illustrated in FIG. 3(b).

Then, in the state of FIG. 3(b), the liquid to be separated and the eluent in the filling portion 10 are circulated between the filling portions 10 by a downward stream, and the separation of the plurality of components is advanced (step 102: a separating and circulating step). Note that, at this time, the supply of the liquid to be separated and the eluent is not performed.

In this case, the connection path on-off valves X1, X2, and X3 are opened, and the other on-off valves are closed. Then, the pump PM is operated, and thus, the liquid to be separated and the eluent in the filling portion 10 are circulated between the filling portions 10 by a downward stream. That is, in this case, the connection path on-off valves X1, X2, and X3 are opened, and thus, all of the filling portions 10 are in a state of being connected by the pipings HX1, HX2, HX3, and HX4, and the bypass path HB, and a circulation path is formed. Then, the pump PM is operated, and the liquid to be separated or the eluent is moved in the circulation path. Here, the liquid to be separated and the eluent in the filling portion 10 are moved in the downward direction by one filling portion 10. In addition, at this time, the separation of the P component and the R component is advanced. As a result thereof, a concentration distribution having a shape shifted to the right side in the drawing by one is obtained with respect to the filling portion 10 from the state of FIG. 3(a). That is, a concentration distribution having a shape shifted by one is reproduced with respect to the filling portion 10 on the right side in the drawing. Accordingly, returning again to step 101, the same separating treatment can be repeated, and thus, the chromatographic separation can be continuously performed.

Then, whether or not to end the chromatographic separation is determined (step 103). A case where the chromatographic separation is ended, for example, is a case where water to be treated having an amount set in advance is treated. In addition, in a case where a pressure loss is greater than a size set in advance, the chromatographic separation may be ended, or when a separating operation time set in advance has elapsed, the chromatographic separation may be ended.

Then, in a case where the chromatographic separation is ended (Yes in step 103), the separating operation is stopped (step 104).

In contrast, in a case where the chromatographic separation is not ended (No in step 103), the process returns to step 101. That is, two steps of step 101 and step 102 described above are repeated.

Next, the operation of the chromatographic separation device 1 according to this embodiment will be described.

First Embodiment

Here, first, a first embodiment be described as the operation of the chromatographic separation device 1 of this embodiment.

Figure 4:
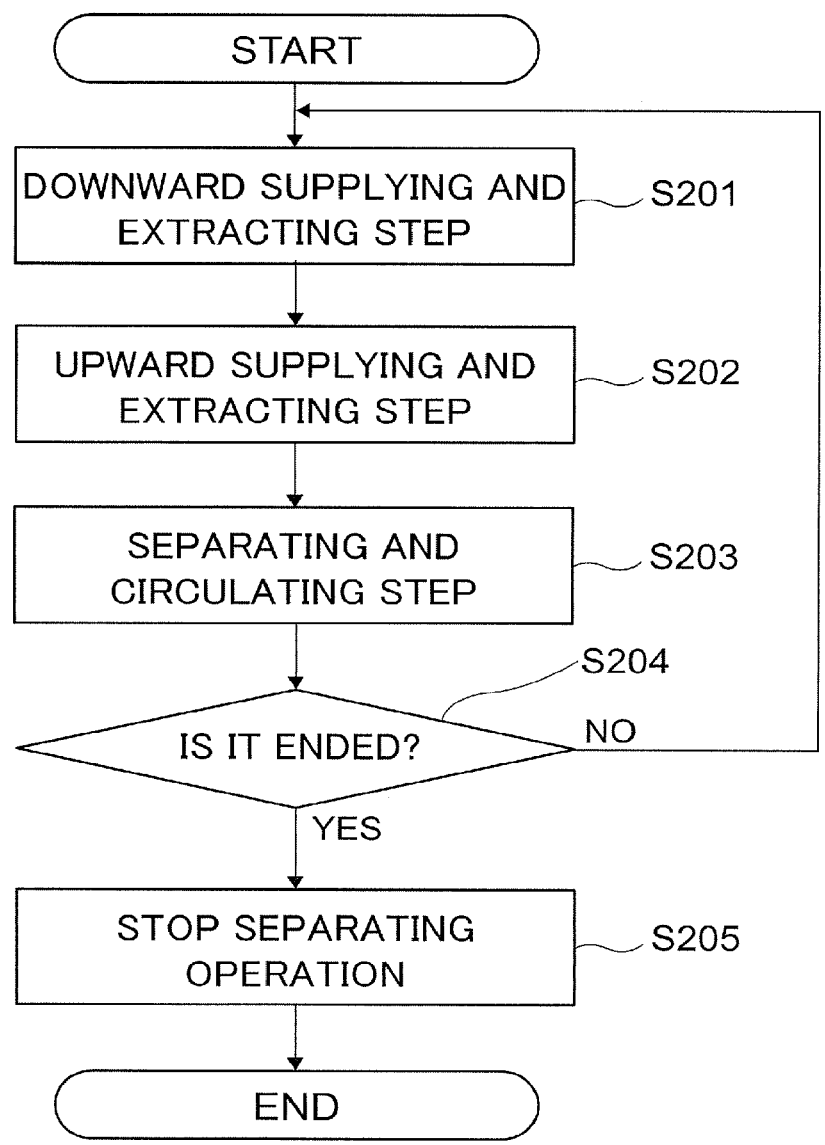
FIG. 4 is a flowchart describing an operation of a chromatographic separation device in a first embodiment.

FIG. 4 is a flowchart describing the operation of the chromatographic separation device 1 in the first embodiment.

Figure 5A:
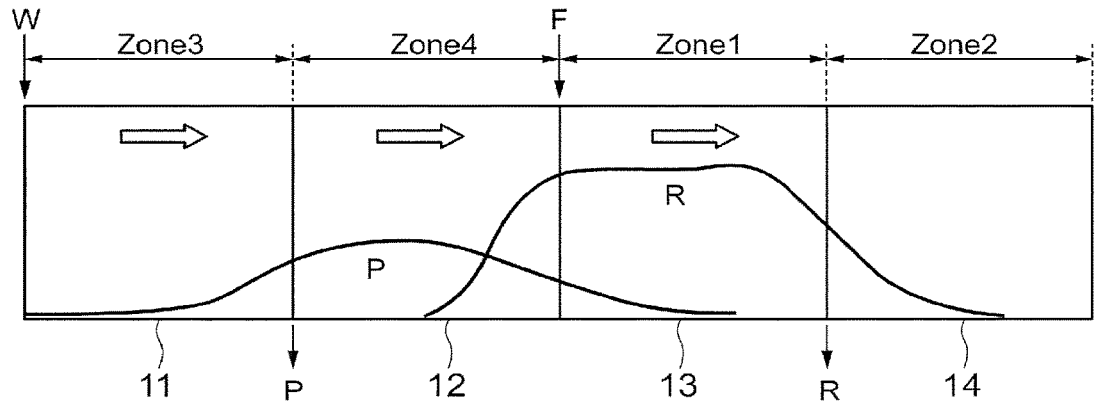
FIGS. 5(a) to 5(c) are diagrams illustrating a concentration distribution of each of a P component and an R component in a filling portion.
Figure 5B:
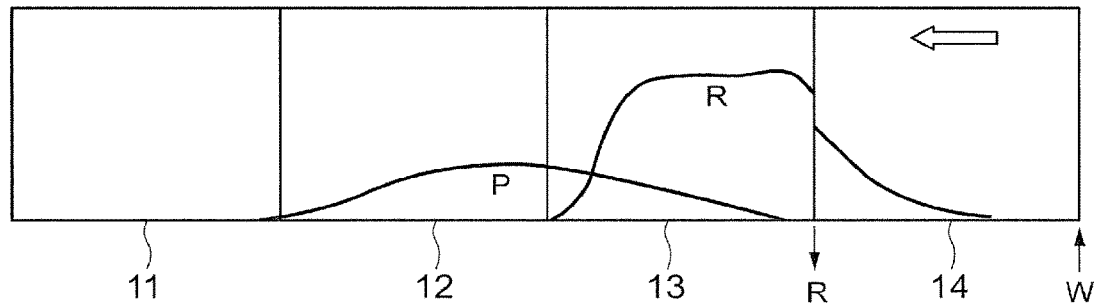
Figure 5C:
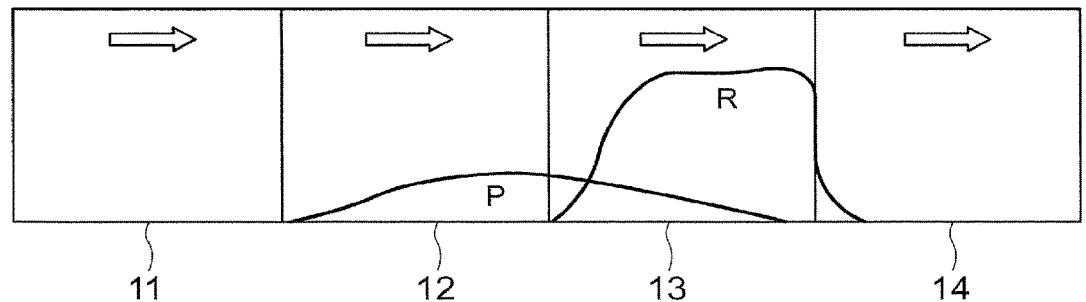

In addition, FIGS. 5(a) to 5(c) are diagrams illustrating the concentration distribution of each of the P component and the R component in the filling portions 11 to 14. Here, as with FIG. 3, the horizontal direction represents the position in the filling portions 11 to 14, and the vertical direction represents the concentration of the P component and the R component in each position. Further, the direction of the arrow, the symbols of F, W, P, and R, and the indication of Zone 1 to Zone 4 are identical to those of FIG. 3.

In the first embodiment, as illustrated in FIG. 4, step 201, and step 203 to step 205 are respectively identical to step 101 to step 104, and are different in that an upward supplying and extracting step of step 202 is performed. Accordingly, hereinafter, the upward supplying and extracting step of step 202 will be mainly described.

Here, at a time point when step 201 is ended, the concentration distribution of the P component and the R component is as illustrated in FIG. 5(b), as with FIG. 3(b).

Then, in the state of FIG. 5(b), the separated liquid is extracted from the supply portion 20 of the filling portion 10 for supplying the eluent while the eluent is supplied to any of the extraction portions 30 by an upward stream (step 202: an upward supplying and extracting step).

In the upward supplying and extracting step, the eluent on-off valve W1, the connection path on-off valves X3 and X4, and the component on-off valve R3 are opened, and the other on-off valves are closed. Accordingly, the eluent is supplied to the filling portion 14 from the extraction portion 34. In addition, the R fraction that is the separated liquid rich in the R component is extracted from the supply portion 24 of the filling portion 14.

Specifically, the eluent is supplied from a point at which the concentration of the P fraction and the R fraction is low, in particular, a point at which the concentration of the R fraction is low. That is, the same eluent is supplied from a point at which only the eluent is almost contained, and thus, an influence on the concentration distribution of the R and P components is small, and therefore, separating performance does not decrease. On the other hand, in a case where the eluent is supplied from a point at which the concentration of the R and P components is high in a reverse direction (by an upward stream), the eluent partially comes out to a position different from the original elution position, and thus, the purity of a final product decreases, and therefore, the performance desired to be improved in the chromatographic separation is degraded.

That is, in the upward supplying and extracting step, the eluent flows to the filling portion 14 by an upward stream, and thus, the R component flowing into the upper portion of the filling portion 14 is extracted while the consolidation of the separating agent is relaxed. Specifically, the connection path on-off valves X1 and X2 are closed, and thus, the eluent flows into the lower side of the filling portion 14 from the extraction portion 34 and is circulated in the filling portion 14 by an upward stream, and the total amount thereof is extracted from the supply portion 24 on the upper side of the filling portion 14 as the R fraction. Further, a circulation direction of the eluent in the filling portion 14 is an upward stream and is directed toward the upper side from the lower side. For this reason, the consolidation of the separating agent can be relaxed. In addition, a branch pipe filter for a liquid to be separated or an eluent may be provided in the supply portion 24. In this case, the branch pipe filter is washed with an upward stream, and thus, it is possible to expect a reduction in the pressure loss of the device. Here, in a case where the flow rate of the upward stream is overly low, the separating performance is decreased by a one-sided flow due to a dispersion failure, or the like, and thus, it is necessary for the upward stream to have a certain degree of flow rate. Specifically, a linear velocity (LV) is desirably greater than or equal to 0.5 m/hr and less than or equal to 10.0 m/hr, and is more desirably greater than or equal to 1.0 m/hr and less than or equal to 5.0 m/hr.

As illustrated in FIG. 5(b), in the filling portion 14, the P component rarely exists, and almost only the R component exists. In addition, the connection path on-off valves X1 and X2 are closed, and thus, the concentration distribution of the P component nd the R component in the filling portions 11, 12, and 13 is not changed, and only the concentration distribution of the R component in the filling portion 14 is changed. For this reason, even in a case where the eluent flows by an upward stream on a side reverse to the general separating operation, the separation of the P component and the R component is not disturbed. Then, in this case, the consolidation of the separating agent can be relaxed, and the R fraction can also be extracted.

Then, at a time point when step 202 is ended, the concentration distribution of the P component and the R component is as illustrated in FIG. 5(c).

Then, in the state of FIG. 5(c), the liquid to be separated and the eluent in the filling portion 10 is circulated between the filling portions 10 by a downward stream, and the separation of the plurality of components is advanced (step 203: a separating and circulating step). Accordingly, the liquid to be separated or the eluent is moved in the circulation path. Here, the liquid to be separated and the eluent in the filling portion 10 are moved in the downward direction by one filling portion 10. In addition, at this time, the separation of the P component and the R component is advanced. As a result thereof, a concentration distribution having a shape shifted to the right side in the drawing by one is obtained with respect to the filling portion 10 from the state of FIG. 5(a). That is, a concentration distribution having a shape shifted by one is reproduced with respect to the filling portion 10 on the right side in the drawing. Accordingly, returning again to step 201, the same separating treatment can be repeated, and thus, the chromatographic separation can be continuously performed.

FIGS. 6(a) to 6(l) are diagrams illustrating the direction of the flow of the liquid to be separated or the eluent in the filling portions 11 to 14 in a case where three steps of step 201 to step 203 (the downward supplying and extracting step, the upward supplying and extracting step, and the separating and circulating step) are repeated four times (the first cycle to the fourth cycle). Here, FIGS. 6(a) to 6(c) are the first cycle, and FIGS. 6(d) to 6(f) are the second cycle. In addition, FIGS. 6(g) to 6(i) are the third cycle, and FIGS. 6(j) to 6(l) are the fourth cycle. In addition, in FIG. 6, as with FIG. 5, the right arrow indicates the downward stream, and the left arrow indicates the upward stream. Further, a case where the right arrow and the left arrow are not illustrated indicates there is no flow in the filling portions 11 to 14. Then, the lower arrow and the upper arrow represent the point for supplying the liquid to be separated or the eluent and the point for extracting the P fraction or the R fraction. In this case, the liquid to be separated is represented by "F", the eluent is represented by "W", the P component or the P fraction is represented by "P", and the R component or the R fraction is represented by "R".

In addition, Table 1 described below shows each of the on-off valves of the switching portion 40 to be opened. Note that, on-off valves other than the on-off valves shown here are closed.

TABLE 1

| Cycle | Step | Supplied liquid | Extracted liquid | Opened on-off valve |
|---|---|---|---|---|
| 1 | Downward supplying and extracting step | Liquid to be separated Eluent | P R | X1, X2, F3, W1, P1, R3 |
|   | Upward supplying and extracting step | Eluent | R | X3, X4, W1, R3 |
|   | Separating and circulating step | — | — | X1, X2, X3 |
| 2 | Downward supplying and extracting step | Liquid to be separated Eluent | P R | X2, X3, F4, W2, P2, R4 |
|   | Upward supplying and extracting step | Eluent | R | X1, X4, W2, R4 |
|   | Separating and circulating step | — | — | X1, X2, X3 |
| 3 | Downward supplying and extracting step | Liquid to be separated Eluent | P R | X3, F1, W3, P3, R1 |
|   | Upward supplying and extracting step | Eluent | R | X1, X2, W3, R1 |
|   | Separating and circulating step | — | — | X1, X2, X3 |
| 4 | Downward supplying and extracting step | Liquid to be separated Eluent | P R | X1, F2, W4, P4, R2 |
|   | Upward supplying and extracting step | Eluent | R | X2, X3, W4, R2 |
|   | Separating and circulating step | — | — | X1, X2, X3 |

In the case of comparing FIGS. 6(a) to 6(c), FIGS. 6(d) to 6(f), FIGS. 6(g) to 6(l), and FIGS. 6(j) to 6(l), respectively, the position in the direction of the flow, the point for supplying the liquid to be separated or the eluent, and the point for extracting the P fraction or the R fraction are respectively shifted to the right side in the drawing (the downstream side) one by one with respect to the filling portion 10. That is, the position in the direction of the flow, the point for supplying the liquid to be separated or the eluent, and the point for extracting the P fraction or the R fraction are sequentially moved to the downstream side in the downward stream. In addition, in the upward supplying and extracting step, it can also be described that the filling portion 10 that is used when eluent flows by an upward stream is sequentially moved to the upstream side in the upward stream at each time when the upward supplying and extracting step is repeated. Then, with reference to FIG. 6, it is found that the filling portion 10 in which the eluent flows by a downward stream in the downward supplying and extracting step and the filling portion 10 in which the eluent flows by an upward stream in the upward supplying and extracting step that is initially performed after the downward supplying and extracting step are different filling portions. Further, in FIG. 6, in the position for extracting the R fraction, the eluent flows to one or a plurality of filling portions 10 by a downward stream in the downward supplying and extracting step, the R fraction of the plurality of components contained in the liquid to be separated is extracted from the extraction portion 30 of the filling portion 10 that is positioned on the most downstream in the filling portion 10 used at that time, the eluent flows to one or a plurality of filling portions 10 by an upward stream in the upward supplying and extracting step, and the R fraction is extracted from an upward stream extraction portion of the filling portion 10 that is positioned on the most downstream in the filling portion 10 used at that time. In this case, the R fraction is an example of one component. In addition, with reference to Table 1, similarly, the positions of the on-off valves to be opened are respectively shifted to the right side in the drawing (the downstream side) one by one with respect to the filling portion 10. Note that, in a case where one cycle is repeated four times, the state returns again to the original state. That is, the state returns to FIG. 6(*a*) after FIG. 6(*l*).

As described above, in this embodiment, the upward supplying and extracting step of extracting any component contained in the liquid to be separated from the supply portion 20 while supplying the eluent to at least one filling portion 10 from the extraction portion 30 by an upward stream is provided.

Note that, a point for supplying the eluent by an upward stream may be provided in the filling portion 10 separately from the extraction portion 30. That is, the extraction portion 30 is provided in the filling portion 10, and separately, the point for supplying the eluent by an upward stream is provided in the lower portion of the filling portion 10. In this case, the point for supplying the eluent by an upward stream can be attained as an upward stream supply portion for supplying the eluent to the filling portion 10, in the upward supplying and extracting step.

In addition, similarly, point for extracting any component contained in the liquid to be separated may be provided in the filling portion 10 separately from the supply portion 20. That is, the supply portion 20 is provided in the filling portion 10, and separately, the point for extracting any component contained in the separated liquid is provided in the upper portion of the filling portion 10. In this case, the point for extracting any component contained in the separated liquid can be attained as the upward stream extraction portion for extracting the eluent from the filling portion 10, in the upward supplying and extracting step.

Here, as described above, the upward stream supply portion is set to the extraction portion 30, and the upward stream extraction portion is set to the supply portion 20, and thus, it is possible to further simplify a device configuration.

Second Embodiment

Next, a second embodiment will be described as the operation of the chromatographic separation device 1.

Figure 7:
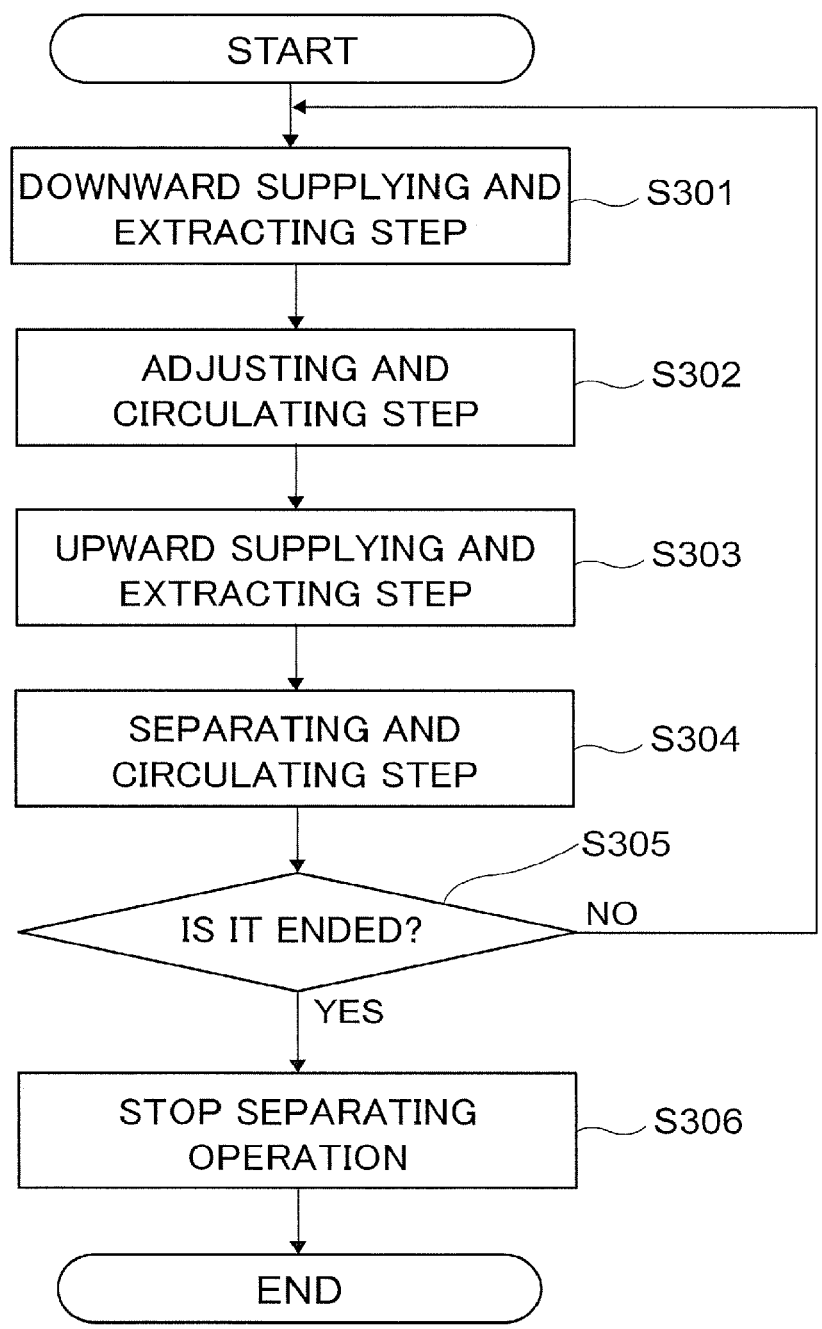
FIG. 7 is a flowchart describing an operation of a chromatographic separation device in a second embodiment.

FIG. 7 is a flowchart describing the operation of the chromatographic separation device 1 in the second embodiment. In addition, FIGS. 8(*a*) to 8(*d*) are diagrams illustrating the concentration distribution of the P component and the R component in each of the filling portions 11 to 14. Here, as with FIGS. 3 and 5, the horizontal direction represents the position in the filling portions 11, 12, 13, and 14, and the vertical direction represents the concentration of the P component and the R component. Further, the direction of the arrow, the symbols of F, W, P, and R, and the indication of Zone 1 to Zone 4 are identical to those of FIGS. 3 and 5.

In the second embodiment, an adjusting and circulating step is inserted between the downward supplying and extracting step and the upward supplying and extracting step, compared to the first embodiment. In addition, the steps other than the adjusting and circulating step are the same, and thus, in the following description, the adjusting and circulating step will be mainly described.

In this case, step 301, and step 303 to step 306 illustrated in FIG. 7 are respectively identical to step 201 to step 205 of FIG. 4. In addition, FIGS. 8(*a*), 8(*c*), and 8(*d*) are respectively identical to FIGS. 5(*a*) to 5(*c*).

At a time point when step 301 is ended, the concentration distribution of the P component and the R component is as illustrated in FIG. 8(*b*). Then, in the state of FIG. 8(*b*), the liquid to be separated and the eluent in the filling portion 10 are circulated between the filling portions 10 by a downward stream, and the position of the liquid to be separated and the eluent in the filling portion 10 is moved to a start position of the next step (step 302: an adjusting and circulating step). Note that, at this time, the supply of the liquid to be separated and the eluent is not performed. Accordingly, it is possible to adjust the position of the concentration distribution of the liquid to be separated or the eluent to a better position for the next step.

In the adjusting and circulating step of step 302, as with the separating and circulating step of step 203 in FIG. 4, the connection path on-off valves X1, X2, and X3 are opened, and the other on-off valves are closed. Then, the pump PM is operated, and thus, the liquid to be separated and the eluent in the filling portion 10 are circulated between the filling portions 10 by a downward stream. As a result thereof, the liquid to be separated and the eluent in the filling portion 10 are moved in the downward direction by a constant amount.

In the adjusting and circulating step, the fraction that is the separated liquid rich in the R component in the filling portion 14 is extracted in the next step, and thus, it is necessary to adjust a circulation amount such that the P component in the filling portion 13 does not flow into the filling portion 14.

Then, at a time point when step 302 is ended, the concentration distribution of the P component and the R component is as illustrated in FIG. 8(*c*). In the adjusting and circulating step, the R component is maximally moved into the filling portion 14, and the P component is prevented from flowing into the filling portion 14.

Then, in the state of FIG. 8(*c*), as with the first embodiment, the separated liquid is extracted from the supply portion 20 of the filling portion 10 in which the extraction portion 30 for supplying the eluent is provided while the eluent is supplied to any of the extraction portions 30 by an upward stream (step 303: an upward supplying and extracting step).

As a result thereof, at a time point when step 303 is ended, the concentration distribution of the P component and the R component is as illustrated in FIG. 8(*d*).

Then, in the state of FIG. 8(*d*), the liquid to be separated and the eluent in the filling portion 10 are circulated between the filling portions 10 by a downward stream, and the separation of the plurality of components is advanced (step 304: a separating and circulating step). Accordingly, the liquid to be separated or the eluent is moved in the circulation path. Here, the liquid to be separated and the eluent in the filling portion 10 are moved in the downward direction by one filling portion 10. In addition, at this time, the separation of the P component and the R component is advanced. As a result thereof, a concentration distribution having a shape shifted to the right side in the drawing by one is obtained with respect to the filling portion 10 from the state of FIG. 8(*a*). That is, a concentration distribution having a shape shifted to the right side in the drawing by one is reproduced with respect to the filling portion 10. Accordingly, returning again to step 301, the same separating treatment can be repeated, and thus, the chromatographic separation can be continuously performed.

In the second embodiment, the adjusting and circulating step is performed, and thus, it is possible to adjust the position of the concentration distribution of the liquid to be separated or the eluent to a better position, compared to the first embodiment. In addition, in the second embodiment, in the adjusting and circulating step, it is possible to supplement an operation for advancing the separation performed in the downward supplying and extracting step by the liquid to be separated flowing into the filling portion 12 from the filling portion 11. Accordingly, in the previous downward supplying and extracting step, a part or a total amount of the liquid to be separated flowing into the filling portion 12 from the filling portion 11 may be reduced. In this embodiment, the upward supplying and extracting step is performed, and thus, a use amount of the eluent increases, but as described above, it is possible to suppress the use amount of the liquid to be separated or the eluent to be supplied. On the other hand, in the first embodiment, the adjusting and circulating step is not performed, and thus, there is an advantage that the separating operation time can be easily shortened, compared to the second embodiment.

FIGS. 9(*a*) to 9(*p*) are diagrams illustrating the direction of the flow of the liquid to be separated or the eluent in the filling portions 11 to 14 in a case where four steps of step 301 to step 304 (the downward supplying and extracting step, the adjusting and circulating step, the upward supplying and extracting step, and the separating and circulating step) are repeated four times (the first cycle to the fourth cycle). Here, FIGS. 9(*a*) to 9(*d*) are the first cycle, and FIGS. 9(*e*) to 9(*h*) are the second cycle. In addition, FIGS. 9(*i*) to 9(*l*) are the third cycle, and FIGS. 9(*m*) to 9(*p*) are the fourth cycle. In addition, the indication of the arrow illustrated in FIG. 9 is identical to that of FIG. 6.

In addition, Table 2 described below shows each of the on-off valves of the switching portion 40 to be opened. Note that, on-off valves other than the on-off valves shown here are closed.

TABLE 2

| Cycle | Step | Supplied liquid | Extracted liquid | Opened on-off valve |
|---|---|---|---|---|
| 1 | Downward supplying and extracting step | Liquid to be separated Eluent | P R | X1, X2, F3, W1, P1, R3 |
|   | Adjusting and circulating step | — | — | X1, X2, X3 |
|   | Upward supplying and extracting step | Eluent | R | X3, X4, W1, R3 |
|   | Separating and circulating step | — | — | X1, X2, X3 |
| 2 | Downward supplying and extracting step | Liquid to be separated Eluent | P R | X2, X3, F4, W2, P2, R4 |
|   | Adjusting and circulating step | — | — | X1, X2, X3 |
|   | Upward supplying and extracting step | Eluent | R | X1, X4, W2, R4 |
|   | Separating and circulating step | — | — | X1, X2, X3 |
| 3 | Downward supplying and extracting step | Liquid to be separated Eluent | P R | X3, F1, W3, P3, R1 |
|   | Adjusting and circulating step | — | — | X1, X2, X3 |
|   | Upward supplying and extracting step | Eluent | R | X1 X2, W3, R1 |
|   | Separating and circulating step | — | — | X1 X2, X3 |
| 4 | Downward supplying and extracting step | Liquid to be separated Eluent | P R | X1, F2, W4, P4, R2 |
|   | Adjusting and circulating step | — | — | X1, X2, X3 |
|   | Upward supplying and extracting step | Eluent | R | X2, X3, W4, R2 |
|   | Separating and circulating step | — | — | X1, X2, X3 |

In the case of comparing FIGS. 9(a) to 9(d), FIGS. 9(e) to 9(h), FIGS. 9(i) to 9(l), and FIGS. 9(m) to 9(p), respectively, the position in the direction of the flow, the point for supplying the liquid to be separated or the eluent, and the point for extracting the P fraction or the R fraction are respectively shifted to the right side in the drawing (the downstream side) one by one with respect to the filling portion 10. In addition, with reference of Table 2, similarly, the positions of the on-off valves to be opened are respectively shifted to the right side in the drawing (the downstream side) one by one with respect to the filling portion 10. Note that, in a case where one cycle is repeated four times, the state returns again to the original state. That is, the state returns to FIG. 9(a) after FIG. 9(p).

Note that, the treatment of the liquid to be separated that is performed in the chromatographic separation device 1 described above, in the first embodiment, can be attained by a chromatographic separation method including the following steps of (1), (3), and (4). Each of the steps of (1), (3), and (4) corresponds to each of step 201 to step 203 described above. In addition, in the second embodiment, the treatment can also be attained by a chromatographic separation method including steps of (1) to (4). Each of the steps of (1) to (4) corresponds to each of step 301 to step 304 described above.

(1) A downward supplying and extracting step of supplying the liquid to be separated and the eluent to different filling portions 10 of the plurality of filling portions 10 from the supply portion 20 by a downward stream and of extracting the separated liquid from any of the extraction portions 30

(2) An adjusting and circulating step that is performed between the downward supplying and extracting step and the upward supplying and extracting step, circulates the liquid to be separated and the eluent in the filling portion 10 between the filling portions 10 by a downward stream, and adjusts the position of the liquid to be separated and the eluent (3) An upward supplying and extracting step of extracting any component contained in the liquid to be separated from the upward stream extraction portion while supplying the eluent to at least one filling portion 10 from the upward stream supply portion by an upward stream, in the chromatographic separation method for separating the plurality of components contained in the liquid to be separated by the chromatography, with the chromatographic separation device 1 including the plurality of filling portions 10 filled with the separating agent for separating the plurality of components contained in the liquid to be separated, the supply portion 20 provided in each of the plurality of filling portions 10 to supply the liquid to be separated or the eluent for extracting any component contained in the liquid to be separated to the filling portion 10, extraction portion 30 provided in each of the plurality of filling portions 10 to extract any component contained in the liquid to be separated from the filling portion 10

(4) A separating and circulating step that is performed after the upward supplying and extracting step, circulates the liquid to be separated and the eluent in the filling portion 10 between the filling portions 10 by a downward stream, and advances the separation of the plurality of components Note that, at least one of (2) and (4) can be attained as an example of the circulating step of circulating the liquid to be separated and the eluent in the filling portion 10 between the filling portions 10 by a downward stream, without supplying the liquid to be separated and the eluent.

In addition further, the first embodiment can be attained by a chromatographic separation method in which three steps of (1) the downward supplying and extracting step, (3) the upward supplying and extracting step, and (4) the separating and circulating step are performed in this order. In addition, the first embodiment can also be attained by a chromatographic separation method in which the four steps are repeated.

In addition, the second embodiment can be attained by a chromatographic separation method in which four steps of (1) the downward supplying and extracting step, (2) the adjusting and circulating step, (3) the upward supplying and extracting step, and (4) the separating and circulating step are performed in this order. Further, the second embodiment can also be attained by a chromatographic separation method in which the three steps are repeated.

Further, the invention is not limited to the case of repeating only the three steps or the four steps, and two steps of (1) the downward supplying and extracting step and (4) the separating and circulating step may be repeated in this order, and the three steps or the four steps described above may be inserted during the repetition of the two steps. That is, in this case, when the consolidation of the separating agent does not particularly occur, the two steps can be performed, and when the consolidation of the separating agent occurs, the three steps or the four steps can be performed. That is, while the separating operation is performed by a downward stream, the separating operation is performed by an upward stream in the interval. Whether to perform the three steps or the four steps, or the two steps, for example, may be determined in accordance with the degree of pressure loss, or for example, may be determined in accordance with the number of repeating times of the three steps or the four steps after being performed once, after the two steps is performed 10 times. According to the embodiment, the consolidation of the separating agent can be relaxed, and the separating operation time can be easily shortened.

According to the first embodiment and the second embodiment, it is possible to provide a chromatographic separation method in which the consolidation of the separating agent can be relaxed while the same performance can be obtained in a purity and a recovery rate of each component, compared to the advanced simulated moving bed chromatography of the related art, described in FIGS. 2 and 3. As a result thereof, the chromatographic separation method is capable of contributing to the stable operation of the chromatographic separation device 1 for a long period.

Note that, in the aspect described above, the opening and closing of the switching portion 40 that is an on-off valve may be manually controlled or may be automatically controlled. In addition, the case of manual control and the case of automatic control may be combined. In the case of automatic control, for example, a control unit such as a control board is provided, and the control unit performs the control of the switching portion 40 in cooperation with software and hardware resources. That is, a programmable logic controller (PLC) for control that is provided in the control unit reads a program for controlling the opening and closing of the switching portion 40, and executes the program, and thus, controls the opening and closing of the switching portion 40.

EXAMPLES

Hereinafter, the invention will be described in more detail by using Examples, but the invention is not limited to Examples unless exceeding the gist thereof.

[Separating Operation]

Example 1

In Example 1, a separating operation was performed by the method according to the first embodiment, with the chromatographic separation device 1 illustrated in FIG. 1. A separating operation condition at this time is shown in Table 3.

TABLE 3

| | Step | Example 1 | Example 2 | Comparative Example 1 |
|---|---|---|---|---|
| Operation condition | SV (ml/min) | 0.5 | 0.5 | 0.5 |
| | Treatment amount (ml) | 58.6 | 58.6 | 60.8 |
| | Eluent/liquid to be separated | 2.53 | 2.53 | 2.41 |
| | P fraction/R fraction | 0.98 | 0.98 | 0.98 |
| Liquid amount (1) | Liquid to be separated (ml) | 31.6 | 31.6 | 33.0 |
| (1) | P fraction (ml) | 55.4 | 55.4 | 55.6 |
| (1) | R fraction (ml) | 15.1 | 15.1 | 23.7 |
| (2) | Circulation amount (ml) | — | 3.0 | — |
| (3) | Eluent (ml) | 9.6 | 9.6 | — |
| (4) | Circulation amount (ml) | 158.3 | 155.3 | 149.4 |
| Liquid to be separated | DP3+ (%) | 61.23 | 61.23 | 61.23 |
| | DP2 (%) | 15.40 | 15.40 | 15.40 |
| | DP1 (%) | 23.37 | 23.37 | 23.37 |
| | Concentration (%) | 51.2 | 51.2 | 51.2 |
| Separated liquid (R fraction) | DP3+ (%) | 95.39 | 95.21 | 96.41 |
| | DP2 (%) | 4.29 | 4.41 | 3.38 |
| | DP1 (%) | 0.32 | 0.38 | 0.21 |
| | Concentration (%) | 19.2 | 19.0 | 18.4 |
| | DP3+ purity (%) | 95.38 | 95.21 | 96.41 |
| | DP3+ recovery rate (%) | 87.46 | 87.76 | 87.22 |

Here, starch syrup was used as a liquid to be separated. The starch syrup contains monosaccharide (DP1), disaccharide (DP2), and tri- or higher saccharide (DP3+). The monosaccharide (DP1) is mainly glucose. In addition, the disaccharide (DP2) is mainly maltose. Further, the tri- or higher saccharide (DP3+) is mainly maltotriose. In addition, as shown in Table 3, composition ratios thereof were respectively 61.23%, 15.40%, and 23.37% in a weight ratio when the sum was 100%. In addition, the total concentration of the components with respect to the entire liquid to be separated was 51.2%, as shown in Table 3.

Then, in Example 1, a separating operation or separating the tri- or higher saccharide (DP3+) was performed. In this case, the tri- or higher saccharide (DP3+) can be separated as an R fraction. In addition, desalinated water was used as an eluent. Further, UBK530 that is a cation exchange resin for industrial chromatographic separation, manufactured by Mitsubishi Chemical Corporation, was used as a separating agent, and four columns that are the filling portions 10, were filled with the separating agent. The separating agent is a Na-type strongly acidic cation exchange resin. At this time, in the column, an inner diameter was 29.4 mm, and the height at the time of being filled with the separating agent of 1492 ml was 550 mm.

Then, the temperature of the liquid to be separated and the eluent was 65° C., and a space velocity (SV) in liquid passing was 0.5 min$^{-1}$. In addition, the liquid passing was performed by setting a treatment amount per a resin of 1 L to 58.6 ml and by setting Fluent/Liquid to Be Separated to 2.53 in a volume ratio. In addition, an extraction ratio of a P fraction to an R fraction (P Fraction/R Fraction) was 0.98. Note that, the purpose of Example 1 was to perform the separation of the tri- or higher saccharide (DP3+).

At this time, in (1) the downward supplying and extracting step, a supply amount of the liquid to be separated was 32.4 ml, an extraction amount of the P fraction was 55.4 ml, and an extraction amount of the R fraction was 15.1 ml.

In addition, in (3) the upward supplying and extracting step, a supply amount of the eluent was 9.6 ml.

Further, in (4) the separating and circulating step, a circulation amount was 158.3 ml.

Example 2

In Example 2, a separating operation was performed by the method according to the second embodiment, with the chromatographic separation device 1 illustrated in FIG. 1. At this time, the separating operation condition of (1) the downward supplying and extracting step and (3) the upward supplying and extracting step was identical to that of Example 1. In addition, the circulation amount in (4) the separating and circulating step was reduced to 3.0 ml, compared to Example 1, and thus, was 155.3 ml, and a circulation amount in (2) the adjusting and circulating step was 3.0 ml. Accordingly, a total amount of the circulation amount in one cycle is identical to that of Example 1.

Comparative Example 1

In Comparative Example 1, a separating operation was performed with the chromatographic separation device 1 illustrated in FIG. 1 such that (1) the downward supplying and extracting step and (4) the separating and circulating step were performed, and (2) the adjusting and circulating step and (3) the upward supplying and extracting step were not performed. A separating operation condition at this time was as shown in Table 3.

[Result]

Results are shown in Table 3.

In the case of comparing Example 1 and Example 2 with Comparative Example 1, a component ratio of each of the monosaccharide (DP1), the disaccharide (DP2), and the tri- or higher saccharide (DP3+) to a separated liquid (the R fraction) was approximately the same in a weight ratio. In addition, the total concentration of the components was approximately the same.

In addition, in the case of comparing Example 1 and Example 2 with Comparative Example 1, a purity and a recovery rate of the tri- or higher saccharide (DP3+) in Example 1 and Example 2 were approximately the same, compared to those of Comparative Example 1. Accordingly, it is found that it is possible to provide the chromatographic separation method in which the consolidation of the separating agent can be relaxed while the same performance can be obtained in the purity and the recovery rate of each component, compared to the advanced simulated moving bed chromatography of the related art.

EXPLANATIONS OF LETTERS OR NUMERALS

1 CHROMATOGRAPHIC SEPARATION DEVICE
10 (11, 12, 13, 14) FILLING PORTION
20 (21, 22, 23, 24) SUPPLY PORTION
30 (31, 32, 33, 34) EXTRACTION PORTION
40 SWITCHING PORTION

The invention claimed is:

1. A chromatographic separation method for separating a plurality of components contained in a liquid, with a separating device including a plurality of filling portions filled with a separating agent for separating the plurality of components contained in the liquid,
a supply portion provided in each of the plurality of filling portions to supply the liquid or an eluent for extracting any component contained in the liquid to the filling portion, and
an extraction portion provided in each of the plurality of filling portions to extract any component contained in the liquid from the filling portion,
the method comprising:
an upstream supplying and extracting step of extracting any component contained in the liquid from an upstream stream extraction portion while supplying the eluent to at least one filling portion from an upstream stream supply portion by an upstream stream;
a downward supplying and extracting step of supplying each of the liquid and the eluent to different filling portions of the plurality of filling portions from the supply portion by a downward stream and of extracting a separated liquid from any of the extraction portions; and
a circulating step of circulating the liquid and the eluent in the filling portion between the filling portions by a downward stream, without supplying the liquid and the eluent.

2. The chromatographic separation method according to claim 1,
wherein the upstream stream supply portion is the extraction portion, and the upstream stream extraction portion is the supply portion.

3. The chromatographic separation method according to claim 1,
wherein the circulating step is a separating and circulating step that is performed after the upstream supplying and extracting step and advances the separation of the plurality of components.

4. The chromatographic separation method according to claim 3,
wherein three steps of the downward supplying and extracting step, the upstream supplying and extracting step, and the separating and circulating step are performed in this order.

5. The chromatographic separation method according to claim 4,
wherein the three steps are repeated.

6. The chromatographic separation method according to claim 4,
wherein two steps of the downward supplying and extracting step and the separating and circulating step are repeated in this order, and the three steps are inserted during the repetition of the two steps.

7. The chromatographic separation method according to claim 3,
wherein an adjusting and circulating step is further included as the circulating step,
wherein the adjusting and circulating step is performed between the downward supplying and extracting step and the upstream supplying and extracting step and adjusts a position of the liquid and the eluent.

8. The chromatographic separation method according to claim 7,
wherein four steps of the downward supplying and extracting step, the adjusting and circulating step, the upstream supplying and extracting step, and the separating and circulating step are performed in this order.

9. The chromatographic separation method according to claim 8,
wherein the four steps are repeated.

10. The chromatographic separation method according to claim 8,
wherein two steps of the downward supplying and extracting step and the separating and circulating step are repeated in this order, and the four steps are inserted during the repetition of the two steps.

11. The chromatographic separation method according to claim 5,
wherein the filling portion used when the eluent flows by an upstream stream in the upstream supplying and extracting step is sequentially moved to an upstream side in an upstream stream at each time when the upstream supplying and extracting step is repeated.

12. The chromatographic separation method according to claim 1,
wherein in the upstream supplying and extracting step, a separated liquid is extracted from the upstream stream extraction portion of the filling portion for supplying the eluent.

13. The chromatographic separation method according to claim 1,
wherein the filling portion in which the eluent flows by the downward stream in the downward supplying and extracting step and the filling portion in which the eluent flows by an upstream stream in the upstream supplying and extracting step that is initially performed after the downward supplying and extracting step are different filling portions.

14. The chromatographic separation method according to claim 13,
wherein the eluent flows to one or a plurality of filling portions by the downward stream in the downward supplying and extracting step, one component of the plurality of components contained in the liquid is extracted from the extraction portion of the filling portion that is positioned on the most downstream side in the filling portions used at that time, the eluent flows to one or a plurality of filling portions by an upstream stream in the upstream supplying and extracting step, and the one component is extracted from the upstream stream extraction portion of the filling portion that is positioned on the most downstream in die filling portion used at that time.

* * * * *